US008630676B2

(12) United States Patent
Lee (10) Patent No.: US 8,630,676 B2
(45) Date of Patent: Jan. 14, 2014

(54) WIRELESS COMMUNICATION APPARATUS AND METHOD FOR TRANSMITTING A SIGNAL ACCORDING TO DETERMINED TRANSMISSION POWER AND TRANSMISSION TIME

(75) Inventor: Seung Hwan Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 389 days.

(21) Appl. No.: 12/984,828

(22) Filed: Jan. 5, 2011

(65) Prior Publication Data

US 2012/0021692 A1   Jan. 26, 2012

(30) Foreign Application Priority Data

Jul. 22, 2010   (KR) ........................ 10-2010-0070968

(51) Int. Cl.
*H04W 52/18*   (2009.01)
*H04M 15/00*   (2006.01)
(52) U.S. Cl.
USPC ......................................... 455/522; 455/407
(58) Field of Classification Search
None
See application file for complete search history.

(56) References Cited

U.S. PATENT DOCUMENTS

| 7,324,782 | B1 | 1/2008 | Rudrapatna |
| 7,515,916 | B1 | 4/2009 | Alexander |
| 7,515,917 | B2 | 4/2009 | Casey |
| 2003/0181163 | A1* | 9/2003 | Ofuji et al. ..................... 455/25 |
| 2005/0111647 | A1* | 5/2005 | Mashinsky ............... 379/210.01 |
| 2009/0278743 | A1 | 11/2009 | Wee |

FOREIGN PATENT DOCUMENTS

JP   2003-235072   8/2003
KR   10-2009-0116079   11/2009

* cited by examiner

*Primary Examiner* — Philip Sobutka
(74) *Attorney, Agent, or Firm* — Staas & Halsey LLP (57) ABSTRACT

A wireless communication apparatus and method are provided. The wireless communication apparatus includes: a transmission/reception side location recognizing unit recognizing the location of a transmission side and that of a reception side; a transmission power determining unit recognizing radio wave propagation characteristics according to the locations of the transmission side and the reception side, and determining transmission power in consideration of the radio wave propagation characteristics; a transmission time determining unit analyzing a transmission signal service type and determining a transmission time in consideration of a frequency usage fee if the transmission signal is not required to be transmitted in real time; and a transmission and reception unit transmitting the transmission signal according to the transmission power and the transmission time determined by the transmission power determining unit and the transmission time determining unit.

10 Claims, 5 Drawing Sheets

WIRELESS COMMUNICATION APPARATUS AND METHOD FOR TRANSMITTING A SIGNAL ACCORDING TO DETERMINED TRANSMISSION POWER AND TRANSMISSION TIME

CROSS-REFERENCE TO RELATED APPLICATIONS

This application claims the priority of Korean Patent Application No. 10-2010-0070968 filed on Jul. 22, 2010, in the Korean Intellectual Property Office, the disclosure of which is incorporated herein by reference.

BACKGROUND OF THE INVENTION

1. Field of the Invention

The present invention relates to a wireless communication apparatus and method, and more particularly, to a wireless communication apparatus and method capable of regulating transmission power, a transmission time, a beamforming direction and thickness, and the like, to thus reduce communication costs and minimize inter-device interference.

2. Description of the Related Art

In the field of radio communication, a transmitter and a receiver may not have sufficient information regarding each other, so the transmitter and the receiver frequently perform communication by using more energy than is necessary in order to prevent a degradation of communication quality.

For example, the transmitter and the receiver, each having mobility, cannot accurately recognize each other's location, so they tend to transmit radio waves even in unnecessary directions, rather than performing communication with accurate directionality, causing a loss of energy. Additionally, wasted energy works as an interference signal with a different device, degrading communication performance, so, in order to prevent this problem, more energy needs to be used, causing a vicious cycle.

Namely, in the related art, the transmitter and the receiver do not have enough information regarding each other, unnecessarily increasing energy loss, which leads to an increase in communication costs as well as an unnecessary increase in an interference phenomenon between devices.

SUMMARY OF THE INVENTION

An aspect of the present invention provides a wireless communication apparatus and method capable of managing the location and radio wave propagation information of a device constituting a wireless network as a database and regulating transmission power, a transmission time, a beamforming direction and thickness, and the like, to thus reduce communication costs and minimize inter-device interference.

According to an aspect of the present invention, there is provided a wireless communication apparatus including: a transmitter/receiver location recognizing unit recognizing the location of a transmitter and that of a receiver; a transmission power determining unit recognizing radio wave propagation characteristics according to the locations of the transmitter and the receiver, and determining transmission power in consideration of the radio wave propagation characteristics; a transmission time determining unit analyzing a transmission signal service type and transmitting the transmission signal in real time if the transmission signal is required to be transmitted in real time and determining a transmission time in consideration of a frequency usage fee if the transmission signal is not required to be transmitted in real time; and a transmission and reception unit transmitting the transmission signal according to the transmission power and the transmission time determined by the transmission power determining unit and the transmission time determining unit.

The wireless communication apparatus may further include: a beamforming antenna; and a beamforming antenna controller adjusting a beamforming direction and a thickness of the beamforming antenna according to the locations and the radio wave propagation characteristics of the transmitter and the receiver.

The transmission power determining unit may determine the transmission power in consideration of the radio wave propagation characteristics and the beamforming thickness together.

The apparatus may further include: a transmission signal storage unit storing the transmission signal, which is not required to be transmitted in real time, until a predetermined transmission; and a control information storage unit making a database of the location information and radio wave propagation information of the device to communicate with the wireless communication apparatus and managing and providing the database.

The transmitter/receiver location recognizing unit may search the control information storage unit to recognize the locations of the transmitter and the receiver or may acquire the locations of the transmitter and the receiver via a GPS device having a GPS function, a location-positioning device without GPS, or a DB access device that accesses a central database that stores and provides the location information of each device.

The transmission power determining unit may search the control information storage unit to recognize radio wave propagation characteristics according to the locations of the transmitter and receiver, or estimate radio wave propagation characteristics according to the locations of the transmitter and receiver through a path loss estimation model.

According to another aspect of the present invention, there is provided a wireless communication method including: recognizing the location of a transmitter and that of a receiver to acquire radio wave propagation characteristics; determining transmission power in consideration of the radio wave propagation characteristics; checking whether or not a transmission signal needs to be transmitted in real time; when the transmission signal needs to be transmitted in real time, transmitting the transmission signal in real time according to the transmission power; analyzing a transmission signal service type and transmitting the transmission signal in real time when the transmission signal is required to be transmitted in real time and determining a transmission time in consideration of a frequency usage fee when the transmission signal is not required to be transmitted in real time; and when the transmission signal is not required to be transmitted in real time, transmitting the transmission signal according to the transmission power when the frequency usage fee is lower than a transmission allowable fee.

According to another aspect of the present invention, there is provided a wireless communication method including: recognizing the location of a transmitter and that of a receiver; acquiring radio wave propagation characteristics according to the locations of the transmitter and receiver, and determining a beamforming thickness in consideration of the radio wave propagation characteristics; determining transmission power in consideration of the beamforming thickness and the radio wave propagation characteristics together; checking whether or not the transmission signal needs to be transmitted in real time; when the transmission signal needs to be transmitted in real time, transmitting the transmission signal according to the transmission power; and when the transmission signal does not need to be transmitted in real time, transmitting the transmission signal according to the transmission power when a frequency usage fee is lower than a transmission allowable fee.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

The present invention may be modified variably and may have various embodiments, particular examples of which will be illustrated in drawings and described in detail.

However, it should be understood that the following exemplifying description of the invention is not intended to restrict the invention to specific forms of the present invention but rather the present invention is meant to cover all modifications, similarities and alternatives which are included in the spirit and scope of the present invention.

While terms such as "first" and "second," etc., may be used to describe various components, such components must not be understood as being limited to the above terms. The above terms are used only to distinguish one component from another. For example, a first component may be referred to as a second component without departing from the scope of rights of the present invention, and likewise a second component may be referred to as a first component. The term "and/or" encompasses both combinations of the plurality of related items disclosed and any item from among the plurality of related items disclosed.

When a component is mentioned as being "connected" to or "accessing" another component, this may mean that it is directly connected to or accessing the other component, but it is to be understood that another component may exist therebetween. On the other hand, when a component is mentioned as being "directly connected" to or "directly accessing" another component, it is to be understood that there are no other components in-between.

The terms used in the present application are merely used to describe particular embodiments, and are not intended to limit the present invention. An expression used in the singular encompasses the expression of the plural, unless it has a clearly different meaning in the context. In the present application, it is to be understood that the terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

Unless otherwise defined, all terms used herein, including technical or scientific terms, have the same meanings as those generally understood by those with ordinary knowledge in the field of art to which the present invention belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Embodiments of the present invention will be described below in detail with reference to the accompanying drawings, where those components are rendered using the same reference number that are the same or are in correspondence, regardless of the figure number, and redundant explanations are omitted.

Figure 1:
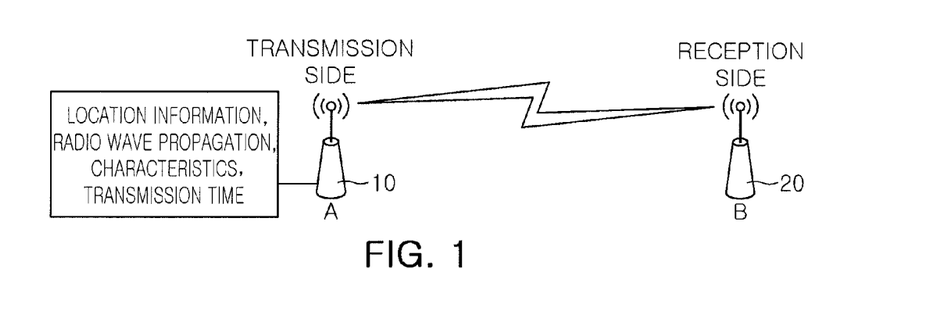
FIG. 1 is a view for explaining an operational concept of a wireless communication apparatus according to an exemplary embodiment of the present invention.

FIG. 1 is a view for explaining an operational concept of a wireless communication apparatus according to an exemplary embodiment of the present invention. In FIG. 1, a transmission side wireless communication apparatus 10 transmits a signal with low transmission power to a reception side wireless communication apparatus 20 at a particular time.

Namely, as shown in FIG. 1, when the transmission side wireless communication apparatus 10 located at a point 'A' knows the location of the reception side wireless communication apparatus 20 located at a point 'B', according to communication information, and also knows about radio wave propagation characteristics, (e.g., the amount of path loss to be expected, and the like) the expected loss in a signal transmitted from point 'A' reaches point 'B', the transmission side wireless communication apparatus 10 transmits a signal using as much power as is required to the reception side wireless communication apparatus 20 at a certain time.

When a real time transmission is required for a voice or video call, the transmission side wireless communication apparatus 10 transmits a signal to the reception side wireless communication apparatus 20 in real time, or otherwise, the transmission side wireless communication apparatus 10 selects a time slot (e.g., a time slot during which a frequency usage fee is lowest) fitting a particular purpose and transmits a signal by using only as much power as is required.

For reference, when energy used for radio communication is E, power is P, a frequency usage fee is $C_f$, a cost incurred for a radio communication during a period of time T may be represented by Equation 1 shown below:

$$C_{total} = E \cdot C_f = PT \cdot \frac{C_f}{T} = P \cdot C_s \qquad \text{[Equation 1]}$$

Here, $C_s$ is a frequency usage fee per unit time

With reference to Equation 1, it is noted that in order to reduce the overall cost for radio communication $C_{total}$ the usage power P and the frequency usage fees $C_f$ and $C_s$ must be reduced.

Thus, in an exemplary embodiment of the present invention, the power of a transmission signal is lowered, a time slot during which a frequency usage fee is low is selected, and a signal is transmitted, thereby reducing the overall cost for radio communication $C_{total}$.

In addition, in an exemplary embodiment of the present invention, factors such as QoS, a signal capacity, a policy, a user usage pattern, and the like, as well as cost, may be used in the method for selecting a transmission time slot, which may be applicable according to the same parameter in selecting a transmission time.

Namely, parameters for selecting a transmission time slot can be variously selected to be used according to a communication purpose. For example, when the effect of guaranteeing QoS is desired to be increased, the transmission time slot may be selected by using parameters such as QoS, policy, and the like. When the effect of guaranteeing system performance is desired to be increased, the transmission time slot may be selected by using a parameter such as a signal capacity. When the effect of providing a personalized service is desired to be increased, the transmission time slot may be selected by using a parameter such as the user usage pattern, and the like.

Hereinafter, the case in which a transmission time is selected by using a frequency usage fee will be described for the sake of brevity.

Figure 2:
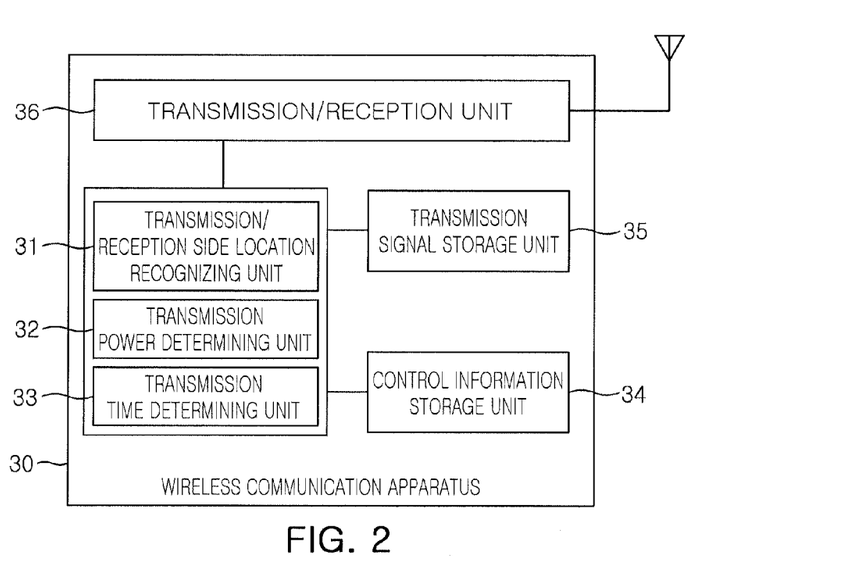
FIG. 2 is a schematic block diagram of the wireless communication apparatus according to an exemplary embodiment of the present invention.

FIG. 2 is a schematic block diagram of the wireless communication apparatus according to an exemplary embodiment of the present invention.

With reference to FIG. 2, the wireless communication apparatus 300 may include a transmission/reception side location recognizing unit 31, a transmission power determining unit 32, a transmission time determining unit 33, a control information storage unit 34, a transmission signal storage unit 35, and a transmission/reception unit 36, and the like.

When a transmission signal is generated, the transmission/reception side location recognizing unit 31 searches the control information storage unit 34 to acquire its location (referred to as a 'transmitter', hereinafter) and location information of a reception side wireless communication apparatus (referred to as a 'receiver', hereinafter). In this case, just in case there is no transmission side and/or reception side location information in the control information storage unit 34, the transmission/reception side location recognizing unit 31 may include a GPS device that acquires location information through a GPS function, a location-positioning device without GPS, or a DB access device that accesses an external device (e.g. the reception side wireless communication apparatus, a central DB, and the like) to acquire location information required for a transmission operation, and directly acquire transmission side location information and/or reception side location information therethrough.

When the transmission/reception side location is acquired by the transmission/reception side location recognizing unit 31, the transmission power determining unit 32 searches the control information storage unit 34 to acquire radio wave propagation characteristics (in particular, the amount of a path loss and fading) according to the location of the transmission/reception side and determines transmission power of the transmission signal on the basis of the acquired radio wave propagation characteristics.

In addition, just in case desired radio wave propagation characteristics through the control information storage unit 34, the transmission power determining unit 32 may have a path loss estimation model (e.g., the Okumura model, the Hata model, or the like) and determine transmission power on the basis of it with feedback information from a reception side in order to reduce a difference between estimation and real values if available. Namely, if there is no information regarding radio wave propagation characteristics according to the location of the reception side in the control information storage unit 34, the transmission power determining unit 32 may determine transmission power by analyzing radio wave propagation characteristics (e.g., a transmission distance, terrain features, weather conditions, and the like) through the path loss estimation model and estimating corresponding radio wave propagation characteristics.

For example, the Okumura model, which was created on the basis of data obtained by measuring Tokyo, Japan, is given as follows, and the path loss L may be calculated by Equation 2 as follows.

$$L = L_{FSL} + A_{MU} - H_{MG} - H_{BG} - K \quad \text{[Equation 2]}$$

Here, $L_{FSL}$ is a free space loss, $A_{MU}$ is an average attenuation, $H_{MG}$ is a height gain of a terminal antenna, $H_{BG}$ is a height gain of a base station antenna, and K is a correction constant.

In addition, a path loss in the Hara model in the downtown area may be calculated by Equation 3 shown below:

$$L = 69.55 + 26.16 \log f - 13.82 \log h_B - C_H + [44.9 - 6.55 \log h_B] \quad \text{[Equation 3]}$$

Here, $h_B$ is an antenna height of a base station, $C_H$ is a correction constant of an antenna height, f is a transmission frequency, and d is a distance.

The transmission time determining unit 33 analyzes a service type of a transmission signal. When the transmission signal needs to be transmitted in real time, like a voice or video call, the transmission time determining unit 33 outputs the transmission signal with currently determined transmission power in real time. Meanwhile, when the transmission signal does not need to be transmitted in real time, the transmission time determining unit 33 determines a transmission time of the transmission signal in consideration of a frequency usage fee.

The control information storage unit 34 stores information related to a transmission/reception side location and radio wave propagation information corresponding to the transmission/reception side location database and manages and provides the same.

When a transmission signal, which does not need to be transmitted in real time, is generated, the transmission signal storage unit 35 temporarily stores the corresponding transmission signal until a predetermined transmission time.

The transmission/reception unit 36 transmits the transmission signal to a reception side of the wireless communication apparatus according to the transmission power and the transmission time determined by the transmission power determining unit 32 and the transmission time determining unit 33. Also, the transmission/reception unit receives various types of control information transmitted from an external device and stores the same in the control information storage unit 34.

Figure 3:
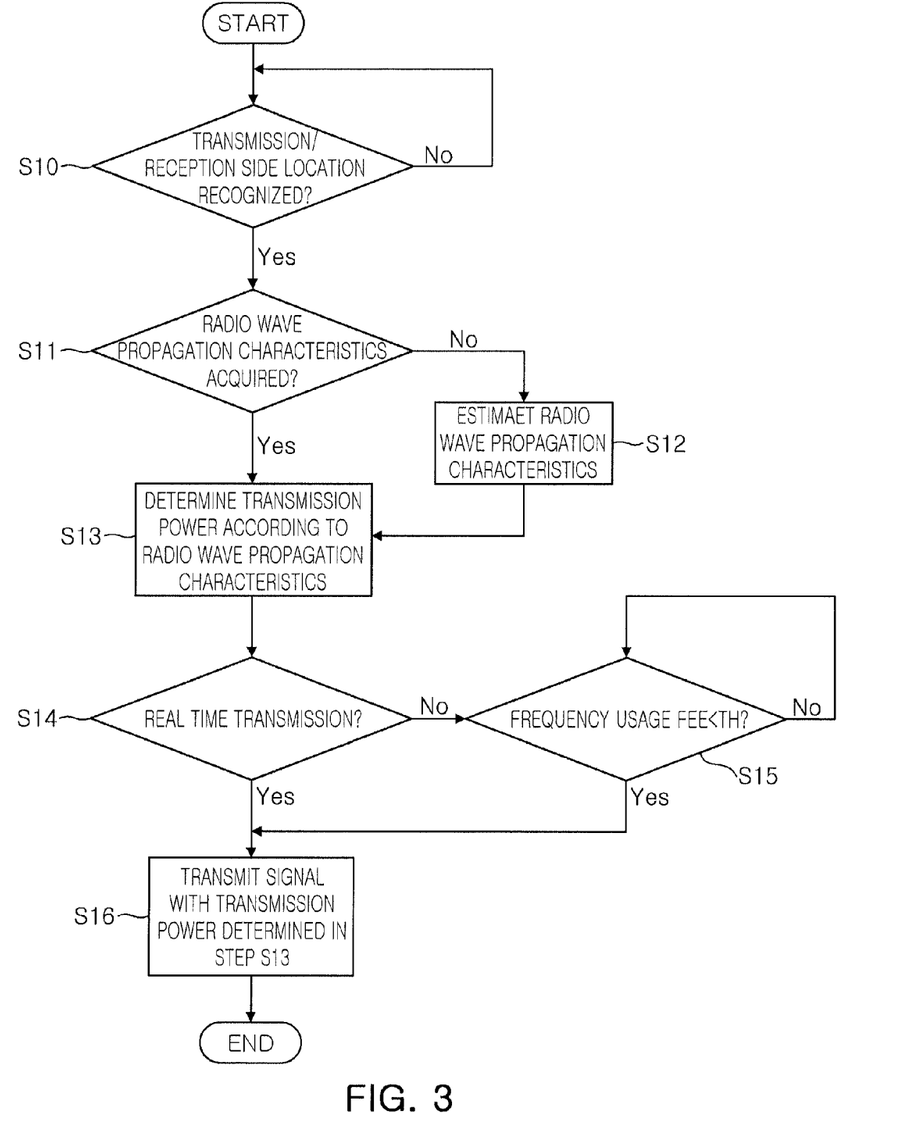
FIG. 3 is a flow chart illustrating the process of a wireless communication method according to an exemplary embodiment of the present invention.

A wireless communication method according to an exemplary embodiment of the present invention will now be described with reference to FIG. 3.

First, the wireless communication apparatus, which wants to transmit a signal, searches control information stored in the control information storage unit 34 to recognize a transmission/reception side location to or from which a transmission signal is to be transmitted/received (step S10), and acquires radio wave propagation characteristics according to the location of the transmission/reception side (step S11).

If the radio wave propagation characteristics according to the location of the transmission/reception side cannot be acquired through the control information storage unit 34, the wireless communication apparatus directly estimates the radio wave propagation characteristics according to the location of the transmission/reception side by using a path loss estimation model (step S12).

When the radio wave propagation characteristics according to the location of the transmission/reception side are acquired in step S11 or S12, transmission power is determined in consideration of the acquired radio wave propagation characteristics (step S13), and it is determined whether or not the transmission signal is to be transmitted in real time (step S14).

If the transmission signal needs to be transmitted in real time according to the determining result of step S14, the transmission signal is transmitted with the transmission power determined in step S13 (step S16), while if the transmission signal does not need to be transmitted in real time, the transmission signal waits until such time as the frequency usage fee is lower than a transmission allowable fee TH previously set by the user (step S15), and then, when the frequency usage fee becomes lower than the transmission allowable fee TH, the transmission signal is transmitted with the transmission power determined in step S13 (step S16).

In this manner, in the wireless communication method according to an exemplary embodiment of the present invention, the transmission power and transmission time are regulated to thereby minimize the cost of transmitting a signal.

Figure 4:
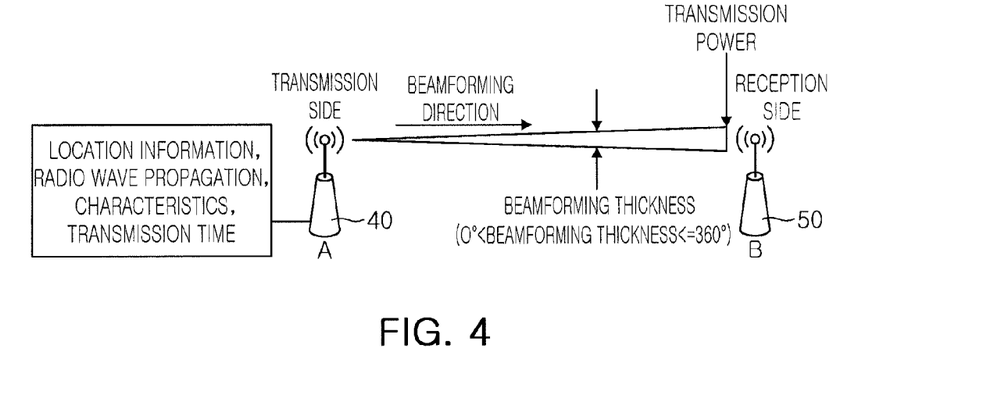
FIG. 4 is a view for explaining an operational concept of a wireless communication apparatus according to another exemplary embodiment of the present invention.
Figure 5:
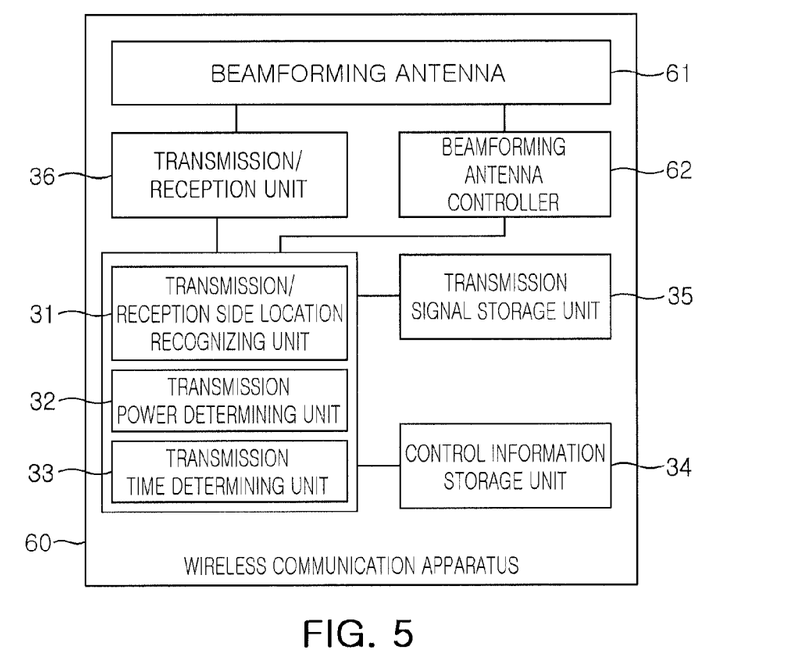
FIG. 5 is a schematic block diagram of the wireless communication apparatus according to another exemplary embodiment of the present invention.

In addition, as shown in FIG. 4, besides the transmission power and transmission time, a beamforming direction and thickness may be also regulated together in order to further reduce communication costs FIG. 5 is a schematic block diagram of the wireless communication apparatus according to another exemplary embodiment of the present invention.

With reference to FIG. 5, a wireless communication apparatus 60 includes an antenna implemented as a beamforming antenna 61 and further includes a beamforming antenna controller 62 in addition to the elements such as the transmission/reception side location recognizing unit 31, the transmission power determining unit 32, the transmission time determining unit 33, the control information storage unit 34, the transmission signal storage unit 35, and the transmission/reception unit 36.

The beamforming antenna controller 62 determines a beamforming direction and a thickness of the beamforming antenna 61 on the basis of the location of the transmission/reception side and corresponding radio wave propagation characteristics, and the transmission power determining unit 32 determines the transmission power of a transmission signal in consideration of the beamforming thickness as well as the radio wave propagation characteristics.

The beamforming antenna 61 generates beamforming having a beamforming thickness and transmission power determined by the beamforming antenna controller 62 and the transmission power determining unit 32, and transmits the generated beamforming in a direction determined by the beamforming antenna controller 62.

Functions of the other elements are the same as those illustrated in FIG. 2, so a detailed description thereof will be omitted.

Figure 6:
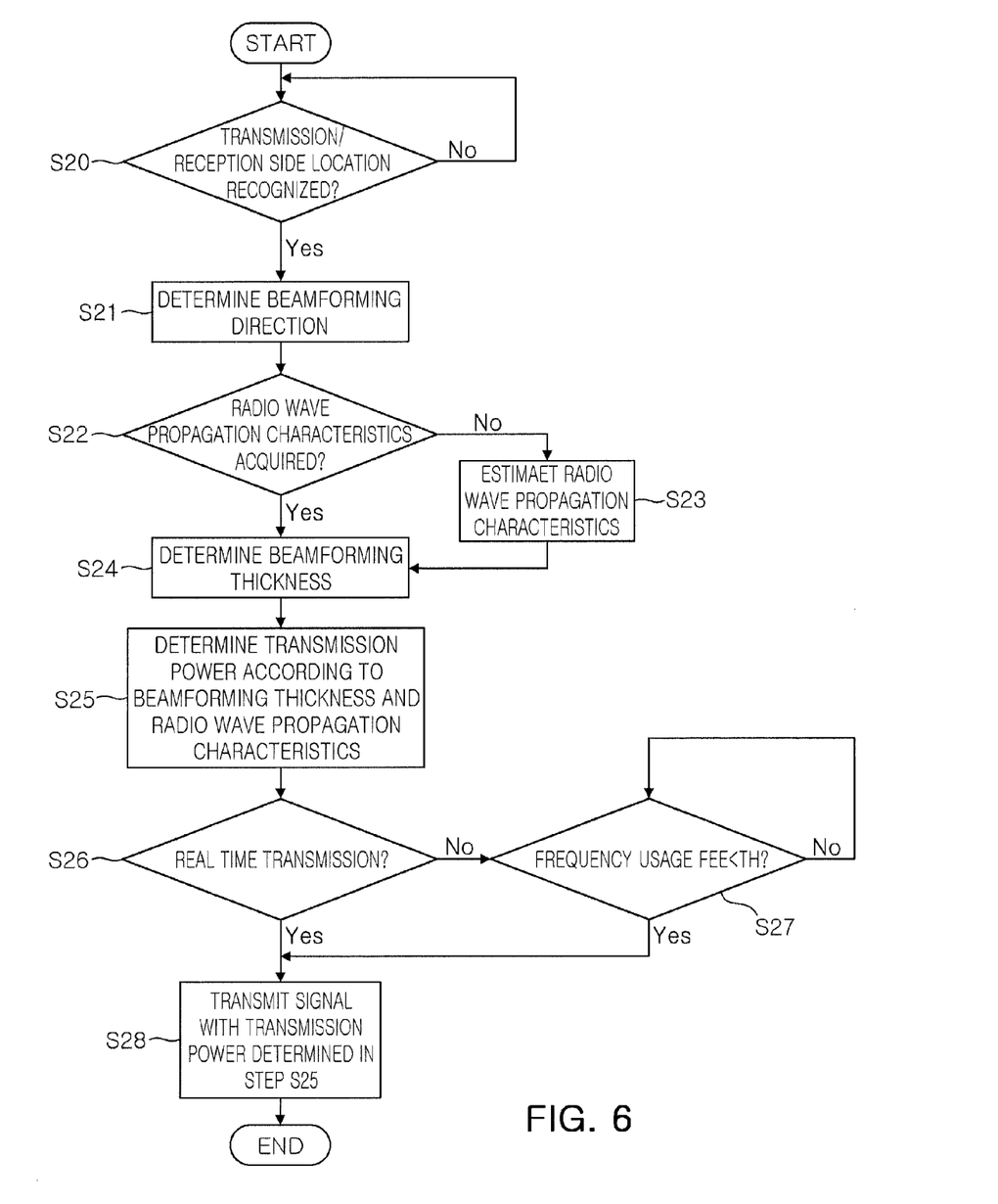
FIG. 6 is a flow chart illustrating the process of a wireless communication method according to another exemplary embodiment of the present invention.

A wireless communication method according to another exemplary embodiment of the present invention will now be described with reference to FIG. 6.

First, the wireless communication apparatus, which wants to transmit a signal, searches control information stored in the control information storage unit 34 to recognize the location of a transmission/reception side (step S20), and determines a transmission direction of beamforming on the basis of the location of the transmission/reception side (step S21).

The wireless communication apparatus searches control information stored in the control information storage unit 34 once more to acquire radio wave propagation characteristics according to the location of the transmission/reception side (step S22) or directly estimates the radio wave propagation characteristics according to the location of the transmission/reception side by using a path loss estimation model (step S23), and then determines a beamforming thickness (in this case, 0°<beamforming thickness<360°) in consideration of the radio wave propagation characteristics (step S24).

Thereafter, the wireless communication apparatus determines transmission power in consideration of the beamforming thickness and the radio wave propagation characteristics together (step S25) and then checks whether or not the transmission signal is to be transmitted in real time (step S26).

If the transmission signal needs to be transmitted in real time according to the check result of step S26, the transmission signal with the transmission power determined in step S25 is transmitted in real time (step S28), while if the transmission signal does not need to be transmitted in real time, the transmission signal waits until such time as the frequency usage fee is lower than a transmission allowable fee TH previously set by the user (step S27), and then, when the frequency usage fee becomes lower than the transmission allowable fee TH, the transmission signal is transmitted with the transmission power determined in step S25 (step S28).

Figure 7:
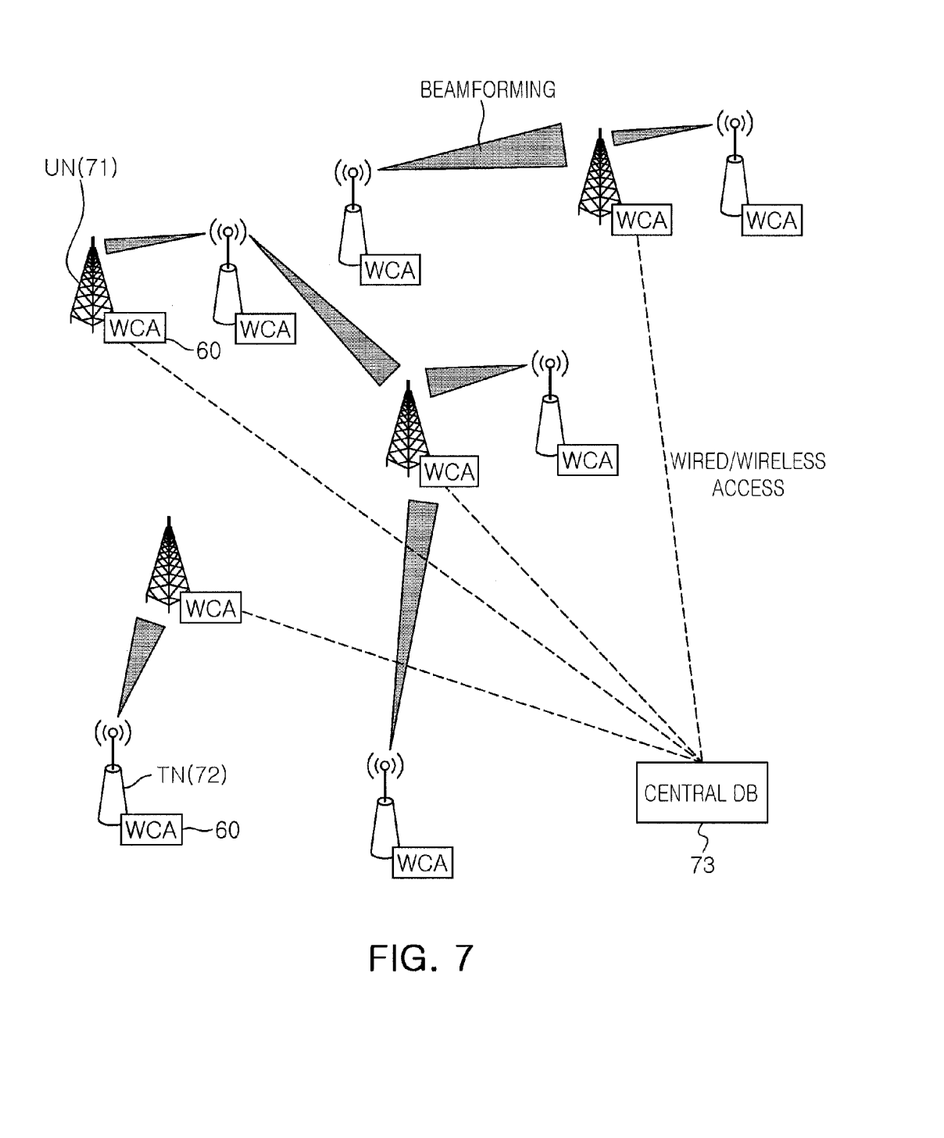
FIG. 7 is a view illustrating an actual application example of the wireless communication apparatus according to an exemplary embodiment of the present invention.

FIG. 7 is a view illustrating an actual application example of the wireless communication apparatus according to an exemplary embodiment of the present invention.

With reference to FIG. 7, a plurality of ubiquitous nodes (UN) 71 and a plurality of terminals (TN) 72 are connected to establish a ubiquitous network, and one or both of the UN 71 and the TN 72 includes the wireless communication apparatus (WCA) 60 constituted as illustrated in FIG. 5 (or the wireless communication apparatus constituted as illustrated in FIG. 2) and perform communication therethrough.

The ubiquitous network established by the UN 71 and the TN 72 configured and operated thusly may perform communication in various manners according to the following operation scenario. Also, the following operation scenario may be separately applied to may be combined to be used.

First, communication may be performed such that the UN 71 transmits a signal and the TN 72 receives the signal.

In order to transmit the signal to the TN 72, the UN 71 must know about the location of the TN 72 and radio wave propagation characteristics according to the location. To this end, the TN 72 reports its location to the UN 71 whenever the location of the TN 72 is changed. Meanwhile, on the basis of the UN 71, radio wave propagation information in a wireless channel may be determined irrespective of the type of the TN 72. Thus, each TN 72 may transmit radio wave propagation information according to its location, and the UN 71 may accumulate the information and use it regardless of the type of TNs, rather than always measuring a radio wave propagation map according to the location by using a measurement instrument.

When the UN 71 recognizes the location and the radio wave propagation information of the TN 72, it dynamically regulates a beamforming direction and thickness, transmission power, and the like, within a range in which communication performance requirements of the TN 72 are satisfied, searches a time slot fitting the communication purpose (e.g., a communication time period during which the cost is smallest, a real time service is satisfied, and the like), and transmits a signal.

Second, communication may be performed such that the TN 72 transmits a signal and the UN 71 receives the signal.

In order for the TN 72 to transmit a signal to the UN 71, the TN 72 must know about location information of the UN 71 and information regarding radio wave propagation from the TN 72 to the UN 71. The TN 72 may store to retain the information in advance or may be directly received from the UN 71, or may indirectly update a DB at an application level.

Based on the information, the TN 72 determines a beamforming direction and thickness, a transmission time, and the like, and transmits a signal to the UN 71.

In this case, the transmission time of the TN 72 may be unilaterally determined by the UN 71, or the TN 72 may determine the transmission time through provided DB information or may determine it after discussing with the UN 71. If a time division duplex (TDD) scheme is used, because transmission/reception radio wave propagation characteristics may be the same, the UN 71 and the TN 72 may share a radio wave propagation map in the first and second scenarios.

Third, communication may be performed with several UN 71s while the TN 72 is moving.

In this case, unlike the existing handover, the TN and the UN 71 know about a predetermined UN-TN connection configuration according to a location, so the TN 72 and the UN 71 perform a handover procedure according to a DB. Because a plurality of UNs 71 are involved in the handover, a central DB 73 wiredly or wirelessly connected with the respective UNs 71 is provided to control the DB.

While receiving required information from the central DB 73, the TN 72 and the UN 71 perform communication by regulating transmission power, beamforming direction and thickness, transmission time, and the like.

Fourth, the TN 72 or the UN 71 does not perform communication as required by the user but update only control information autonomously for a communication operation.

When the UN 71 and the TN 72 need to update the DB as the location of the UN 71 is changed or as the radio wave propagation information is changed, the TN 72 and the UN 71 transmit and receive a signal related to updating of the control information while regulating the transmission power, the beamforming direction and thickness, the transmission time, and the like, and accordingly, the TN 72 and UN 71 may update the DB autonomously.

As described above, the wireless communication apparatus according to an exemplary embodiment of the present invention can be applicable variably to devices that perform radio communication, and support communication according to various operation scenarios.

As set forth above, according to exemplary embodiments of the invention, location information and radio wave propagation information of a device constituting a wireless network are managed as a database, based on which transmission power and a transmission time are actively regulated, thereby minimizing an unnecessary energy loss. Thus, communication costs can be reduced and interference between communication devices can be minimized.

Also, because an antenna is implemented as a beamforming antenna and even a beamforming direction and beamforming thickness are adjusted, the effect of reducing communication costs and restraining interference between communication devices can be further increased.

In addition, a parameter for determining a transmission time can be variably changed according to a communication purpose, the communication costs can be reduced and QoS and system performance can be guaranteed.

While the present invention has been shown and described in connection with the exemplary embodiments, it will be apparent to those skilled in the art that modifications and variations can be made without departing from the spirit and scope of the invention as defined by the appended claims.

What is claimed is:

1. A wireless communication apparatus comprising:
   a transmission/reception side location recognizing unit recognizing the location of a transmission side and that of a reception side;
   a transmission power determining unit recognizing radio wave propagation characteristics according to the locations of the transmission side and the reception side, and determining transmission power in consideration of the radio wave propagation characteristics;
   a transmission time determining unit analyzing a transmission signal service type and transmitting the transmission signal in real time with the transmission power determined by the transmission power determining unit when the transmission signal is required to be transmitted in real time and determining a transmission time in consideration of a frequency usage fee only when the transmission signal is not required to be transmitted in real time; and
   a transmission unit transmitting the transmission signal according to the transmission power and the transmission time determined by the transmission power determining unit and the transmission time determining unit.

2. The apparatus of claim 1, further comprising:
   a beamforming antenna; and
   a beamforming antenna controller adjusting a beamforming direction and a thickness of the beamforming antenna according to the locations and the radio wave propagation characteristics of the transmission side and the reception side.

3. The apparatus of claim 2, wherein the transmission power determining unit determines the transmission power in consideration of the radio wave propagation characteristics and the beamforming thickness together.

4. The apparatus of claim 2, further comprising:
   a transmission signal storage unit storing the transmission signal, which is not required to be transmitted in real time, until a predetermined transmission; and
   a control information storage unit making a database of the location information and radio wave propagation information of the device to communicate with the wireless communication apparatus and managing and providing the database.

5. The apparatus of claim 4, wherein the transmission/reception side location recognizing unit searches the control information storage unit to recognize the locations of the transmission side and the reception side.

6. The apparatus of claim 2, wherein when the locations of the transmission side and the reception side cannot be recognized through the control information storage unit, the transmission/reception side location recognizing unit recognizes the locations of the transmission side and reception side through a GPS device that acquires location information through a GPS function, a location-positioning device without GPS or a DB access device that acquires location information required for a transmission operation.

7. The apparatus of claim 4, wherein the transmission power determining unit searches the control information storage unit to recognize radio wave propagation characteristics according to locations of the transmission side and reception side.

8. The apparatus of claim 7, wherein when the radio wave propagation characteristics according to the locations of the transmission side and the reception side cannot be recognized through the control information storage unit, the transmission power determining unit estimates radio wave propagation characteristics according to the locations of the transmission side and reception side through a path loss estimation model.

9. A wireless communication method comprising:
- recognizing locations of a transmission side and a reception side to acquire radio wave propagation characteristics;
- determining transmission power in consideration of the radio wave propagation characteristics;
- checking whether or not a transmission signal needs to be transmitted in real time;
- when the transmission signal needs to be transmitted in real time, transmitting the transmission signal in real time according to the transmission power; and
- only when the transmission signal is not required to be transmitted in real time, transmitting the transmission signal according to the transmission power when a frequency usage fee is lower than a transmission allowable fee.

10. A wireless communication method comprising:
- recognizing locations of a transmission side and a reception side to determine a beamforming direction;
- acquiring radio wave propagation characteristics according to the locations of the transmission side and reception side, and determining a beamforming thickness in consideration of the radio wave propagation characteristics;
- determining transmission power in consideration of the beamforming thickness and the radio wave propagation characteristics together;
- checking whether or not the transmission signal needs to be transmitted in real time;
- when the transmission signal needs to be transmitted in real time, transmitting the transmission signal in real time according to the transmission power; and
- only when the transmission signal does not need to be transmitted in real time, transmitting the transmission signal according to the transmission power when a frequency usage fee is lower than a transmission allowable fee.

* * * * *